United States Patent
Sakurai

(10) Patent No.: US 10,033,571 B2
(45) Date of Patent: Jul. 24, 2018

(54) REMOTELY-MANAGED DEVICE, METHOD FOR BEING REMOTELY MANAGED, AND PROGRAM FOR BEING REMOTELY MANAGED

(71) Applicants: SUMITOMO ELECTRIC INDUSTRIES, LTD., Osaka-shi, Osaka (JP); SUMITOMO ELECTRIC NETWORKS, INC., Tokyo (JP)

(72) Inventor: Akihiro Sakurai, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 53 days.

(21) Appl. No.: 14/422,434

(22) PCT Filed: Jul. 9, 2013

(86) PCT No.: PCT/JP2013/068723
§ 371 (c)(1),
(2) Date: Feb. 19, 2015

(87) PCT Pub. No.: WO2014/034284
PCT Pub. Date: Mar. 6, 2014

(65) Prior Publication Data
US 2015/0215154 A1    Jul. 30, 2015

(30) Foreign Application Priority Data
Aug. 28, 2012 (JP) .................. 2012-187509

(51) Int. Cl.
G06F 15/173    (2006.01)
H04L 12/24    (2006.01)
(Continued)

(52) U.S. Cl.
CPC ........ *H04L 41/044* (2013.01); *G05B 19/0423* (2013.01); *G06F 8/61* (2013.01);
(Continued)

(58) Field of Classification Search
CPC ....... H04L 41/044; H04L 43/10; H04L 12/24; H04L 12/26; G06F 8/61; G06F 8/62;
(Continued)

(56) References Cited

U.S. PATENT DOCUMENTS

2002/0194527 A1    12/2002  Murai et al.
2005/0010932 A1    1/2005  Kohno et al.
(Continued)

FOREIGN PATENT DOCUMENTS

JP    2002-333990 A    11/2002
JP    2005-031975 A    2/2005
(Continued)

OTHER PUBLICATIONS

Hiroyuki Oomura, "Yasashii Home ICT," Ohmsha, Ltd., issued on Nov. 1, 2011.
(Continued)

*Primary Examiner* — Cheikh Ndiaye
(74) *Attorney, Agent, or Firm* — Drinker Biddle & Reath LLP

(57) ABSTRACT

This remotely-managed device is a remotely-managed device configured to operate on a plurality of hierarchical layers, and includes: a main information processing section for communicating with a managing device by use of a first layer; and a sub information processing section for managing, on a second layer being an upper layer than the first layer, an application operating by use of the second layer, wherein the main information processing section receives instruction information from the managing device in accordance with CWMP, and outputs the received instruction
(Continued)

information to the sub information processing section, and the sub information processing section manages the application based on the instruction information received from the main information processing section.

10 Claims, 7 Drawing Sheets

(51) Int. Cl.
  *G06F 8/61* (2018.01)
  *G06F 8/65* (2018.01)
  *H04L 12/26* (2006.01)
  *G05B 19/042* (2006.01)
(52) U.S. Cl.
  CPC .................. *G06F 8/62* (2013.01); *G06F 8/65* (2013.01); *H04L 43/10* (2013.01); *G05B 2219/23051* (2013.01); *G05B 2219/2613* (2013.01)
(58) Field of Classification Search
  CPC ....... G06F 8/65; G06F 9/445; G05B 19/0423; G05B 2219/2613; G05B 2219/23051
  See application file for complete search history.

(56) References Cited

U.S. PATENT DOCUMENTS

| | | | |
|---|---|---|---|
| 2007/0047017 A1 | 3/2007 | Ando et al. | |
| 2007/0165654 A1* | 7/2007 | Chai | H04L 12/24 370/401 |
| 2007/0275715 A1* | 11/2007 | Lee, II | H04L 12/2814 455/427 |
| 2008/0304500 A1* | 12/2008 | Schliserman | H04L 12/2803 370/401 |
| 2009/0037563 A1* | 2/2009 | Wu | H04L 12/2878 709/220 |
| 2010/0054266 A1* | 3/2010 | Bouchat | H04L 12/2809 370/401 |
| 2010/0131643 A1* | 5/2010 | Okayama | H04L 12/40013 709/224 |
| 2011/0314137 A1 | 12/2011 | Vermoesen | |

FOREIGN PATENT DOCUMENTS

| | | |
|---|---|---|
| JP | 2007-280328 A | 10/2007 |
| JP | 2010-123041 A | 6/2010 |
| JP | 2010-218352 A | 9/2010 |
| JP | 2011-238247 A | 11/2011 |
| JP | 2012-078945 A | 4/2012 |
| JP | 2012-146271 A | 8/2012 |
| WO | WO-2010/102902 A1 | 9/2010 |

OTHER PUBLICATIONS

Office Action (114173) dated Feb. 26, 2014, for JP2012-187509 and its English translation.
Office Action (843571) dated Dec. 25, 2013, for JP2012-187509 and its English translation.

* cited by examiner

REMOTELY-MANAGED DEVICE, METHOD FOR BEING REMOTELY MANAGED, AND PROGRAM FOR BEING REMOTELY MANAGED

TECHNICAL FIELD

The present invention relates to a remotely-managed device, a method for accepting remote management, and a program for accepting remote management. In particular, the present invention relates to a remotely-managed device, a method for accepting remote management, and a program for accepting remote management in which software modules are remotely managed by a managing device via a communication network.

BACKGROUND ART

There has been known home ICT (Information and Communication Technology) in which a plurality of household electric appliances such as air conditioners, lighting, and refrigerators at home are connected to a communication network via a terminal device, and a managing device provided at a remote place remotely manages these household electric appliances via the communication network (see NON PATENT LITERATURE 1, for example). As one protocol for remotely managing such household electric appliances, TR-069 (Technical Report 069) is known. TR-069 is a protocol established by the Broadband Forum, and stipulates communication between a terminal device (hereinafter, also referred to as "remotely-managed device") and a managing device, and control of appliances under control of the terminal device.

In a remotely-managed device in conformance with TR-069, remote management of installation, update, or uninstallation of software modules, i.e., bundles is performed by the managing device. The remotely-managed device can perform operation control and the like of household electric appliances connected thereto, by executing the installed bundles, for example.

CITATION LIST

Non Patent Literature

NON PATENT LITERATURE 1: "Yasashii homu ICT" by Hiroyuki Oomura, Ohmsha, Ltd., issued on Nov. 1, 2011

SUMMARY OF INVENTION

Technical Problem

The remotely-managed device flexibly changes its functions by downloading and installing software modules as necessary and deleting unnecessary software modules. As a software plug-in framework for allowing operation of the same software module even in a case where the manufacturer or the type of hardware is different, and further for allowing addition or replacement of software modules without restarting appliances, there exists OSGi (Open Services Gateway initiative) which is an execution environment for software modules using Java (registered trademark). In the OSGi, a Java VM (virtual machine) is executed as a process on an OS (Operating System), and on that process, an OSGi FW (Framework) being middleware described in Java language operates, and on top of this, one or a plurality of bundles are installed to be executed.

However, in such OSGi, the remotely-managed device realizes the function to perform communication in accordance with TR-069, through operation of bundles. Thus, for example, when abnormality has occurred in bundles in such a case where one bundle among a plurality of bundles installed in the remotely-managed device has monopolized the resource and the other bundles cannot normally operate, the remotely-managed device cannot communicate with the managing device. Thus, there is a problem that the occurrence of the abnormality in the bundles is not notified to the managing device and recovery takes much time.

The present invention has been made in order to solve the above problem. An object of the present invention is to provide a remotely-managed device, a method for accepting remote management, and a program for accepting remote management that can improve resistance against failure of the remotely-managed device.

Solution to Problem

In order to solve the above problem, a remotely-managed device according to an aspect of this invention is a remotely-managed device configured to operate on a plurality of hierarchical layers, the remotely-managed device including: a main information processing section configured to communicate with a managing device, by use of a first layer; and a sub information processing section configured to manage, on a second layer being an upper layer than the first layer, an application operating by use of the second layer, wherein the main information processing section receives instruction information from the managing device in accordance with CWMP (CPE WAN Management Protocol), and outputs the received instruction information to the sub information processing section, and the sub information processing section manages the application based on the instruction information received from the main information processing section.

Advantageous Effects of Invention

According to the present invention, resistance against failure of the remotely-managed device can be improved.

DESCRIPTION OF EMBODIMENTS

Summary of the Embodiment

Figure 1:
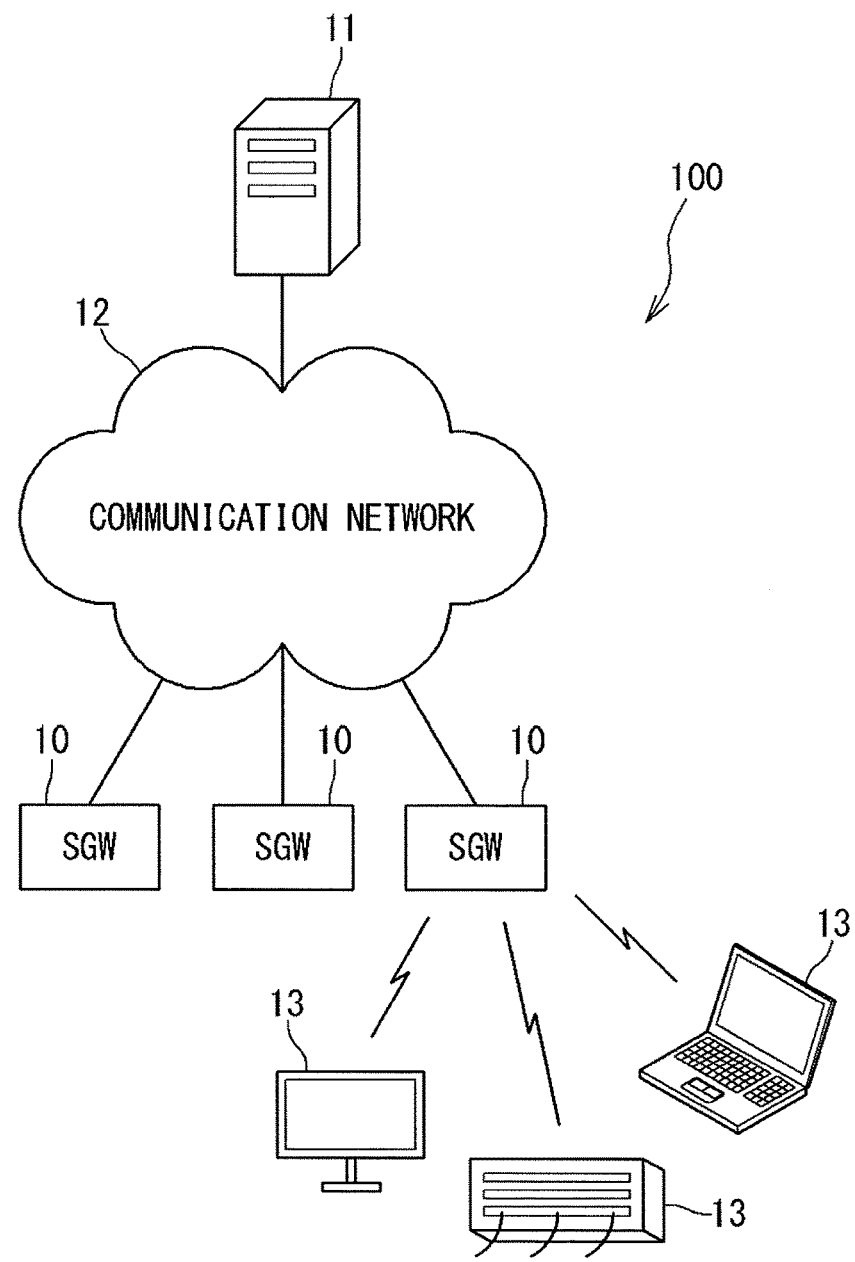
FIG. 1 shows a configuration of a communication system including SGWs according to an embodiment of the present invention.

The summary of the embodiment of the present invention includes the following at least.

(1) This remotely-managed device is a remotely-managed device configured to operate on a plurality of hierarchical layers, the remotely-managed device including: a main information processing section configured to communicate with a managing device, by use of a first layer; and a sub information processing section configured to manage, on a second layer being an upper layer than the first layer, an application operating by use of the second layer, wherein the main information processing section receives instruction information from the managing device in accordance with CWMP (CPE WAN Management Protocol), and outputs the received instruction information to the sub information processing section, and the sub information processing section manages the application based on the instruction information received from the main information processing section.

In this manner, the main information processing section which communicates with the managing device operates by use of a lower layer than the layer where the application operates, and thus, even at occurrence of abnormality in the application, communication between the managing device and the remotely-managed device can be secured, and resistance against failure can be improved. That is, even at occurrence of abnormality in the application, communication between the managing device and the remotely-managed device is secured, whereby the occurrence of the abnormality in the application can be notified to the managing device. Therefore, early recovery of the application can be realized through remote management by the managing device.

(2) Preferably, the main information processing section notifies the managing device of a monitoring result indicating whether the sub information processing section and the application are normally operating.

Through this configuration, even in a case where not only the application but also the sub information processing section which manages the application are not normally operating, early recovery can be realized through the remote management.

(3) Preferably, the main information processing section periodically outputs a monitoring request for monitoring whether the application is normally operating, to the sub information processing section, the sub information processing section receives the monitoring request from the main information processing section, performs the monitoring, and outputs a monitoring result to the main information processing section, and when the monitoring result indicates that the application is not normally operating, the main information processing section notifies the managing device of the monitoring result.

Thus, through the configuration where a monitoring result by the sub information processing section is notified from the main information processing section to the managing device when the application is not normally operating, the managing device need not perform active monitoring, such as periodically making state inquiry to one or a plurality of remotely-managed devices connected to the managing device itself, and thus, load of the managing device can be reduced. In addition, compared with a configuration where a monitoring result is periodically notified to the managing device, communication traffic between the managing device and the remotely-managed device can be reduced.

(4) Preferably, the main information processing section periodically outputs a monitoring request for monitoring whether the application is normally operating, to the sub information processing section, the sub information processing section receives the monitoring request from the main information processing section, performs the monitoring, and outputs a monitoring result to the main information processing section, and the main information processing section notifies the managing device of the monitoring result regardless of whether the monitoring result indicates that the application is not normally operating.

Through this configuration, since a monitoring result indicating whether the application is normally operating is periodically transmitted to the managing device, the managing device can easily grasp that the application is normally operating. In addition, the managing device need not perform active monitoring, such as periodically making state inquiry to one or a plurality of remotely-managed devices connected to the managing device itself, and thus, load of the managing device can be reduced.

(5) Preferably, when the main information processing section receives, from the managing device, a state confirmation request for confirming a state of the remotely-managed device of the main information processing section itself, the main information processing section outputs a monitoring request for monitoring whether the application is normally operating, to the sub information processing section, the sub information processing section receives the monitoring request from the main information processing section, performs the monitoring, and outputs a monitoring result to the main information processing section, and the main information processing section notifies the managing device of the monitoring result indicating whether the application is normally operating.

Through this configuration, the managing device can obtain a monitoring result of operation of the application at a desired timing for the management entity. Accordingly, for example, when the managing device has obtained a monitoring result indicating that the application is not normally operating before transmitting instruction information indicating installation of a new application to the remotely-managed device, the managing device can transmit instruction information for recovery of the application in preference to the instruction information indicating installation of the new application, or the like, and accordingly, the managing device can take appropriate measures in accordance with the state of the remotely-managed device.

(6) Preferably, the main information processing section receives the instruction information from the managing device, creates a plurality of commands based on the instruction information, and outputs the created plurality of commands to the sub information processing section in order.

Through this configuration, the sub information processing section performs operations in order, in accordance with the commands transmitted in order. Thus, when abnormality has occurred during operation of the sub information processing section, it becomes easy to determine which command among the plurality of commands is the cause for the operation where the abnormality occurred, and thus, it becomes possible to take appropriate measures against the abnormality that occurred.

(7) Preferably, the instruction information indicates installation, update, or uninstallation of the application.

Through this configuration, various types of management of the application can be remotely performed from the managing device.

(8) A method for accepting remote management is a method for accepting remote management in a remotely-managed device, the remotely-managed device configured to communicate with a managing device by use of a first layer and configured to manage, on a second layer being an upper layer than the first layer, an application operating by use of the second layer, the method including: a step of the remotely-managed device receiving, by use of the first layer, instruction information from the managing device in accordance with CWMP (CPE WAN Management Protocol); and a step of the remotely-managed device managing, by use of the second layer, the application based on the instruction information.

As described above, the main information processing section which communicates with the managing device operates by use of a lower layer than the layer where the application operates, and thus, even at occurrence of abnormality in the application, communication between the managing device and the remotely-managed device can be secured, and resistance against failure can be improved. That is, even at occurrence of abnormality in the application, communication between the managing device and the remotely-managed device is secured, whereby the occurrence of the abnormality in the application can be notified to the managing device. Therefore, early recovery of the application can be realized through remote management by the managing device.

(9) A program for accepting remote management is a program for accepting remote management to be used in a remotely-managed device, the remotely-managed device configured to communicate with a managing device by use of a first layer and configured to manage, on a second layer being an upper layer than the first layer, an application operating by use of the second layer, the program causing a computer to execute: a step of the remotely-managed device receiving, by use of the first layer, instruction information from the managing device in accordance with CWMP (CPE WAN Management Protocol); and a step of the remotely-managed device managing, by use of the second layer, the application based on the instruction information received from the main information processing section.

Programs can exist in a storage medium when stored in a medium. That is, when the above program is expressed from the viewpoint of a storage medium, there provided is a storage medium readable by a computer and having stored therein a program for accepting remote management to be used in a remotely-managed device, the remotely-managed device configured to communicate with a managing device by use of a first layer and configured to manage, on a second layer being an upper layer than the first layer, an application operating by use of the second layer, the program causing the computer to execute: a step of the remotely-managed device receiving, by use of the first layer, instruction information from the managing device in accordance with CWMP (CPE WAN Management Protocol); and a step of the remotely-managed device managing, by use of the second layer, the application based on the instruction information.

As described above, the main information processing section which communicates with the managing device operates by use of a lower layer than the layer where the application operates, and thus, even at occurrence of abnormality in the application, communication between the managing device and the remotely-managed device can be secured, and resistance against failure can be improved. That is, even at occurrence of abnormality in the application, communication between the managing device and the remotely-managed device is secured, whereby the occurrence of the abnormality in the application can be notified to the managing device. Therefore, early recovery of the application can be realized through remote management by the managing device.

Details of Embodiment

Hereinafter, an embodiment of the present invention will be described with reference to the drawings. In the drawings, the same or corresponding parts are denoted by the same reference signs, and description thereof is not repeated.

[Configuration and Basic Operation]

(Configuration of Communication System)

FIG. 1 shows a configuration of a communication system including SGWs (remotely-managed devices) according to an embodiment of the present invention.

With reference to FIG. 1, a communication system 100 includes one or a plurality of SGWs (Services Gateways) 10 and an ACS (Auto Configuration Servers) 11 (managing device). Each SGW 10 and the ACS 11 are connected via a communication network 12.

Each SGW 10 is a device provided at home, such as, for example, a home gateway, or a general-purpose home device for connecting a home gateway and a household electric appliance, i.e., an end user appliance. The SGW 10 is connected to the communication network 12 and has its software modules remotely managed by the ACS 11 via the communication network 12. The communication network 12 is a network of a specific management entity, and the ACS 11 is a server or the like of the specific management entity.

The SGW 10 receives instruction information transmitted from the ACS 11, installs one or a plurality of software modules from the ACS 11 or another external server, and executes the installed software modules. Here, a state is assumed in which a plurality of household electric appliances 13 are connected to the SGW 10. For example, the SGW 10 can install and execute a power monitoring software module for comprehensively monitoring the power consumption amounts of the plurality of household electric appliances 13.

Specifically, by executing the software module, the SGW 10 receives, via sensors, information regarding the power consumption amounts from the household electric appliances 13 such as television receivers, air conditioners, PCs (Personal Computers), and the like at home. Then, the SGW 10 creates management information based on the received information, and performs operation control of each household electric appliance 13 based on the created management information, for example. In addition, by executing the software module, the SGW 10 can transmit the management information and the like to PCs, such that a user can view the power consumption amounts or statistic information thereof on the PCs or the like.

The SGW 10 can have installed therein not only the power monitoring software module but also a plurality of software modules for providing the user with other services. For example, the SGW 10 has installed therein a software module or the like for providing the user with a home security function by identifying the user who uses the household electric appliances 13, limiting the range accessible by the household electric appliances 13, and the like.

Further, the SGW 10 can not only install software modules, but also perform update or uninstallation of software modules, confirmation of settings of the SGW 10, change of the settings of the SGW 10, resetting the settings of the SGW 10, monitoring whether the software modules are normally operating, or the like, upon receiving instruction information transmitted from the ACS 11.

Communication between the SGW 10 and the ACS 11 is performed in accordance with a protocol defined by TR-069, i.e., CWMP (CPE WAN Management Protocol) which is a specification for remotely managing terminals and which is defined by the Broadband Forum. That is, in accordance with the protocol defined by TR-069, the ACS 11 is connected to one or a plurality of the SGWs 10 via the communication network 12, and transmits instruction information to the SGWs 10, thereby performing various remote managements.

(Configuration of Comparative Example of SGW)

Figure 2:
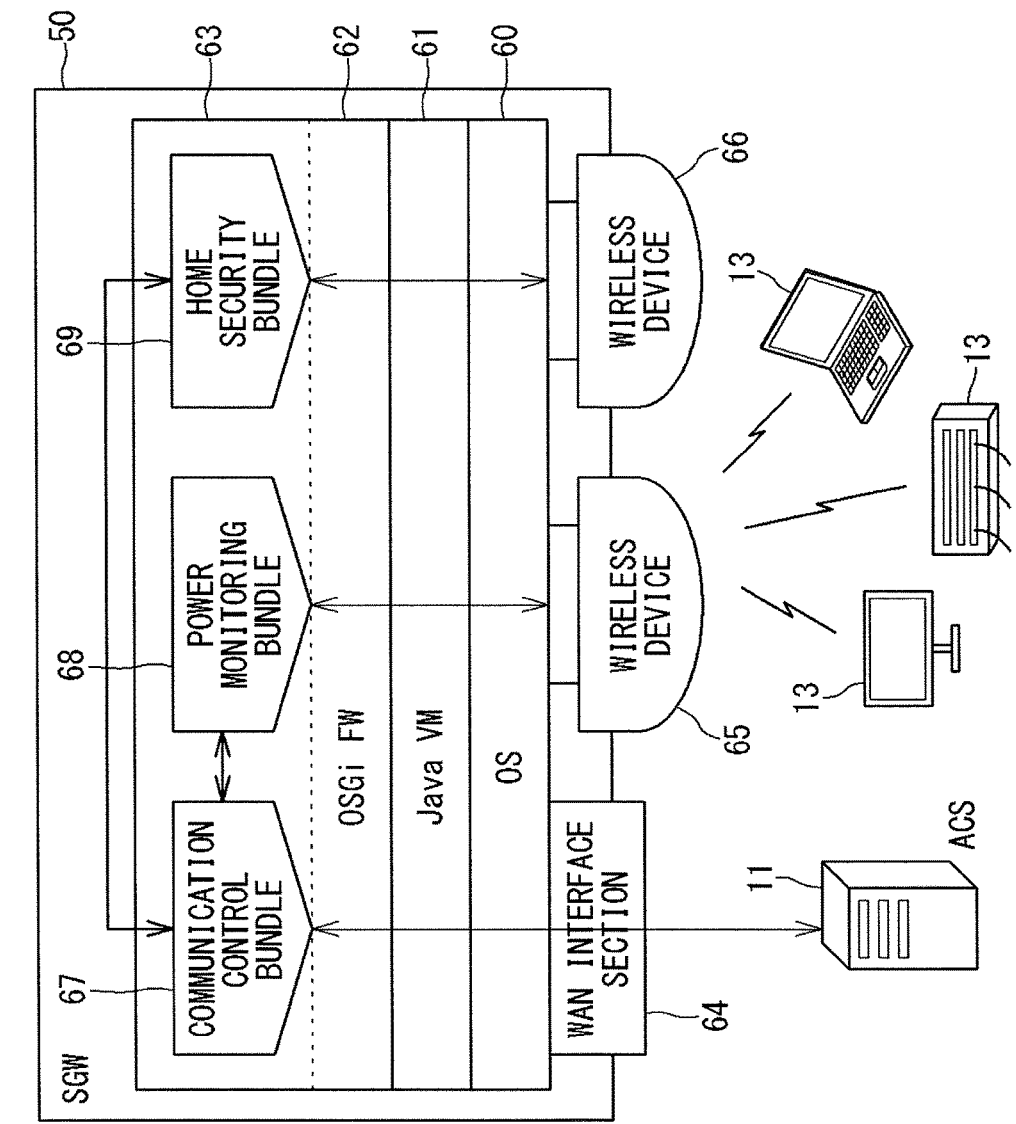
FIG. 2 shows a software configuration of an SGW being Comparative Example of the SGW according to the embodiment of the present invention.

Next, a configuration of an SGW 50 being Comparative Example of the SGW 10 according to the embodiment of the present invention will be described. FIG. 2 shows a software configuration of an SGW being Comparative Example of the SGW according to the embodiment of the present invention.

It should be noted that the SGW 50 being Comparative Example is remotely managed by the ACS 11 via the communication network 12, as in the SGW 10 shown in FIG. 1. Here, a state is assumed in which a plurality of household electric appliances 13 are connected to the SGW 50.

With reference to FIG. 2, software of the SGW 50 being Comparative Example includes an OS (Operating System) 60, a Java virtual machine (Java VM) 61, an OSGi FW (Open Service Gateway initiative Framework) 62, a bundle group 63, and a WAN (Wide Area Network) interface section 64. The bundle group 63 includes a communication control bundle 67, a power monitoring bundle 68, and a home security bundle 69.

The SGW 50 operates on a plurality of hierarchical layers. More specifically, the layer for the OS 60 is the lowest layer (first layer), the upper layer thereof is the layer for the Java virtual machine 61, the upper layer thereof is the layer for the OSGi FW 62, and the upper layer thereof is the layer (second layer) for the bundle group 63. The OS 60 transmits and receives information to and from the plurality of household electric appliances 13 connected to the SGW 50 of the OS 60 itself, via wireless devices 65 and 66.

The OSGi FW 62 is a standardization technology by the OSGi Alliance, and is a software platform which has been created based on open software componentization technology based on Java (registered trademark) language and which provides an execution environment for software components.

It should be noted that each software module, e.g., an application, to be executed on the OSGi FW 62 will be referred to as a "bundle". The SGW 10 can execute bundles of the bundle group 63 singly or in combination, on the OSGi FW 62. Although FIG. 2 shows the communication control bundle 67, the power monitoring bundle 68, and the home security bundle 69 as the bundles included in the bundle group 63, the bundle group 63 may include other bundles not shown in FIG. 2.

The software platform for executing each bundle is not limited to the Java virtual machine 61 and the OSGi FW 62, and another application execution environment may be employed.

Each bundle included in the bundle group 63 operates on the OSGi FW 62 by use of functions provided by the OSGi FW 62. The communication control bundle 67 communicates with the ACS 11 via the WAN interface section 64, the OS 60, and the Java virtual machine 61, on the OSGi FW 62.

For example, upon receiving instruction information indicating installation of a new bundle from the ACS 11, the communication control bundle 67 executes installation of the new bundle in accordance with the received instruction information. Alternatively, for example, upon receiving instruction information indicating update or uninstallation of an already installed bundle from the ACS 11, the communication control bundle 67 executes update or uninstallation of the corresponding bundle in accordance with the received instruction information.

The wireless device 65, 66 receives information regarding household electric appliances 13 from the household electric appliances 13 via USB (Universal Serial Bus) interfaces or the like, for example, and outputs the information to corresponding bundles. In addition, the wireless device 65, 66 obtains control information and the like of household electric appliances 13 from corresponding bundles, and transmits the obtained information to the household electric appliances 13. It should be noted that the wireless device 65, 66 can transmit and receive information to and from household electric appliances 13 via measuring instruments such as watt-hour meters, for example.

The power monitoring bundle 68 comprehensively manages the power consumption amounts of the plurality of household electric appliances 13 at home by, for example, obtaining information indicating the amounts of power being consumed by the household electric appliances 13 via the wireless device 65, and creating statistic information based on the obtained information. The home security bundle 69 is connected to the household electric appliances 13 via the wireless device 66, for example, and provides the user with a home security function.

According to the SGW 50 configured as above, the ACS 11 realizes the function for performing communication in accordance with TR-069, through operation of the communication control bundle 67. Thus, for example, when abnormality has occurred in bundles in such a case where one bundle among the plurality of bundles installed in the SGW 50 has monopolized the resource and the other bundles cannot non tally operate, the SGW 50 cannot communicate with the ACS 11. Thus, there is a problem that the occurrence of the abnormality in the bundles is not notified to the ACS 11 and recovery takes much time.

Therefore, the SGW 10 according to the embodiment of the present invention has the following configuration. Hereinafter, the configuration of the SGW 10 according to the embodiment of the present invention will be described.

(Configuration of SGW According to the Embodiment of the Present Invention)

Figure 3:
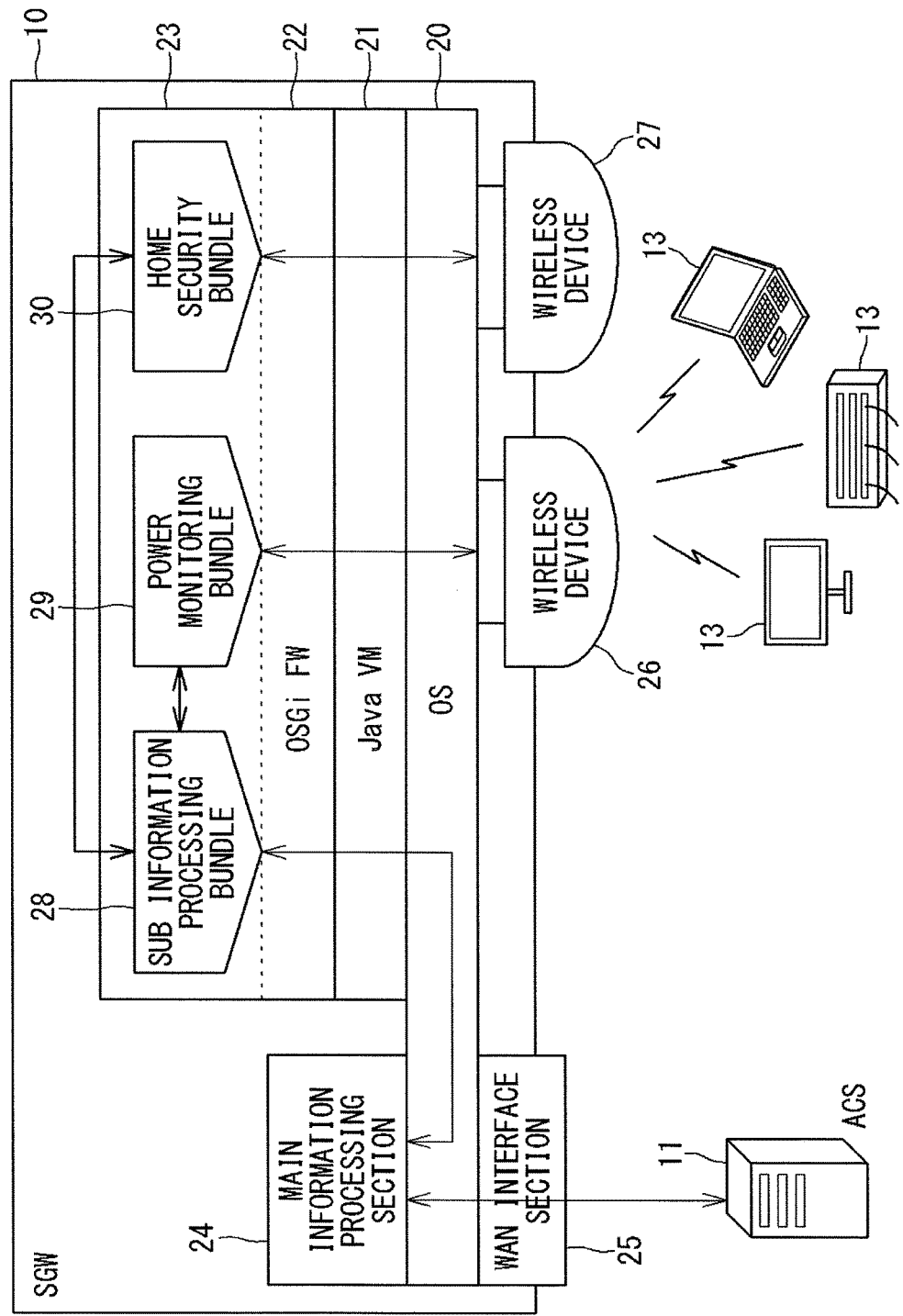
FIG. 3 shows a software configuration of the SGW according to the embodiment of the present invention.

Next, a detailed configuration of the SGW 10 will be described. FIG. 3 shows a software configuration of the SGW according to the embodiment of the present invention.

With reference to FIG. 3, the software of the SGW 10 includes an OS 20, a Java virtual machine 21, an OSGi FW 22, a bundle group 23, a main information processing section 24, and a WAN interface section 25. The bundle group 23 includes a sub information processing bundle 28

(sub information processing section), a power monitoring bundle 29, and a home security bundle 30.

The hierarchical structure of software of the SGW 10 is the same as that of the SGW 50 being Comparative Example, other than that the main information processing section 24 has been added. The OS 20, the Java virtual machine 21, the OSGi FW 22, the WAN interface section 25, and wireless devices 26 and 27 are the same as the OS 60, the Java virtual machine 61, the OSGi FW 62, the WAN interface section 64, and the wireless devices 65 and 66 shown in FIG. 2, respectively. Thus, detailed description thereof is not repeated here.

The main information processing section 24 operates on the OS 20 by use of functions provided by the OS 20. Specifically, the main information processing section 24 communicates with the ACS 11 via the WAN interface section 25, on the OS 20. The main information processing section 24 executes communication functions provided in the OSGi FW 22 and the OS 20, i.e., for example, performs socket communication in accordance with TCP/IP (Transmission Control Protocol/Internet Protocol) with the sub information processing bundle 28, thereby performing input and output of information.

More specifically, upon receiving instruction information indicating installation of a new bundle, update or uninstallation of an already installed bundle, or the like via the WAN interface section 25 from the ACS 11, the main information processing section 24 generates a plurality of commands based on the received instruction information. For example, upon receiving instruction information indicating installation of a bundle A and a bundle B from the ACS 11, the main information processing section 24 generates a command indicating installation of the bundle A and a command indicating installation of the bundle B. Then, the main information processing section 24 outputs the generated plurality of commands in order through socket communication, to the sub information processing bundle 28.

In accordance with the commands received from the main information processing section 24, the sub information processing bundle 28 performs bundle management, i.e., operation such as installation, update, or uninstallation of bundles other than itself, in the order in which the commands have been received.

In addition, periodically or when receiving a state confirmation request of the SGW 10 from the ACS 11, the main information processing section 24 outputs, to the sub information processing bundle 28, a monitoring request for monitoring whether the sub information processing bundle 28, the power monitoring bundle 29, and the home security bundle 30 are normally operating. It should be noted that the state confirmation request is a signal to be transmitted from the ACS 11 to the SGW 10 in order to obtain state information of the SGW 10, such as information regarding bundles installed in the SGW 10.

Upon receiving the monitoring request, the sub information processing bundle 28 monitors whether the power monitoring bundle 29 and the home security bundle 30 are normally operating, and outputs a monitoring result to the main information processing section 24. The sub information processing bundle 28 can also output a monitoring result indicating whether the sub information processing bundle 28 itself is normally operating, to the main information processing section 24.

Then, the main information processing section 24 transmits, to the ACS 11, the monitoring result indicating whether the sub information processing bundle 28, the power monitoring bundle 29, and the home security bundle 30 are normally operating. Details of this monitoring operation will be described later.

[Operation]

Next, operation of the communication system 100 according to the embodiment of the present invention will be described for each of "the flow of operation of the communication system when instruction information has been transmitted from the ACS", and "the flow of monitoring operation of monitoring whether bundles are normally operating".

Figure 4:
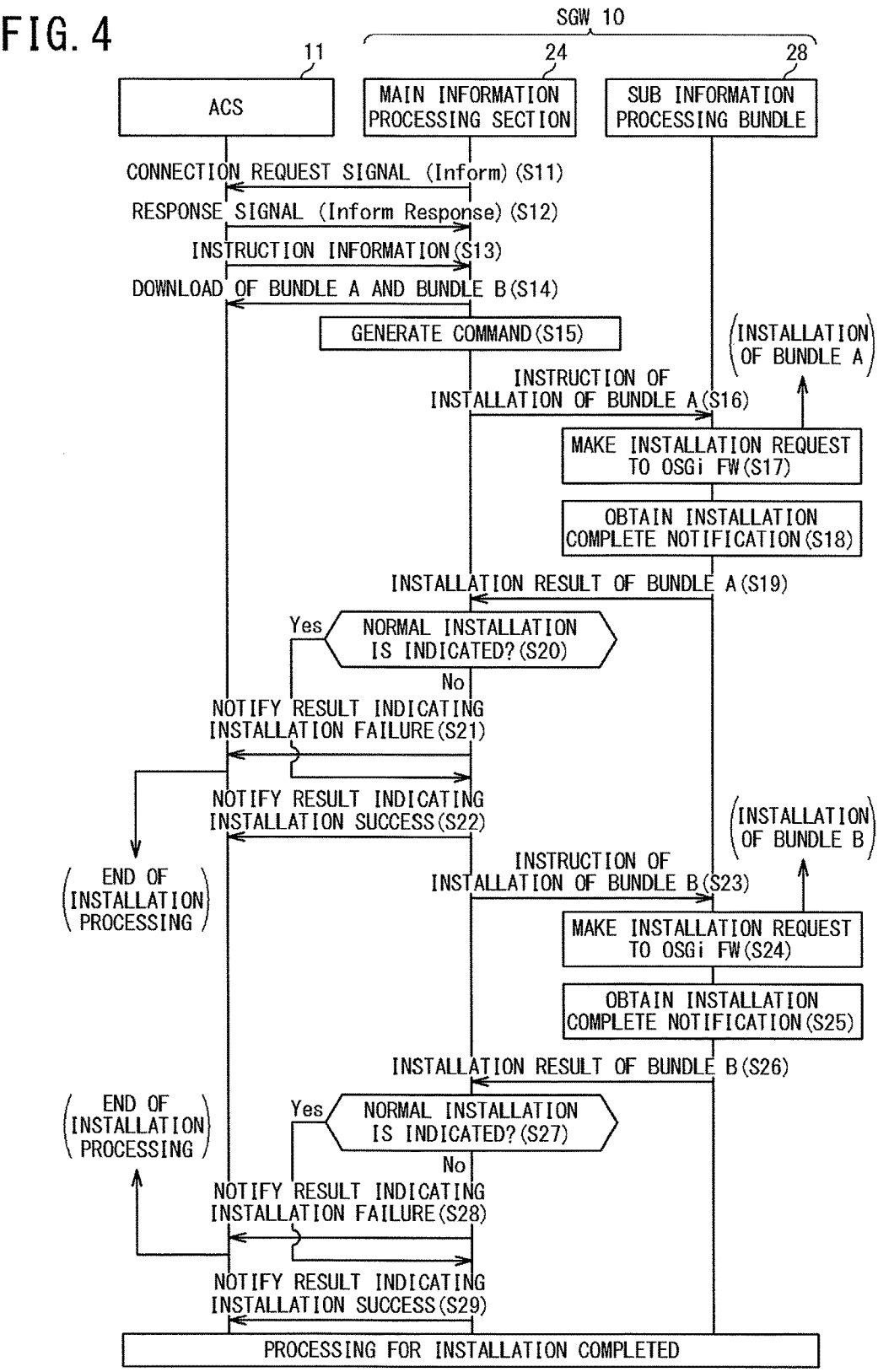
FIG. 4 is a sequence diagram showing the flow of operation when instruction information is transmitted from an ACS, in the communication system according to the embodiment of the present invention.

(a) The Flow of Operation of the Communication System when Instruction Information has been Transmitted from the ACS FIG. 4 is a sequence diagram showing the flow of operation when instruction information is transmitted from the ACS, in the communication system according to the embodiment of the present invention. Here, a case is assumed in which instruction information indicating installation of the bundle A and the bundle B is transmitted from the ACS 11 to the SGW 10.

With reference to FIG. 4, first, the main information processing section 24 of the SGW 10 transmits a connection request signal (Inform) for a session to the ACS 11. This connection request signal is a signal that is transmitted from the SGW 10 to the ACS 11 in order to confirm establishment of a session between the SGW 10 and the ACS 11 in accordance with the protocol defined by TR-069, for example. The connection request signal includes state information of the SGW 10 such as information regarding bundles installed in the SGW 10 (step S11).

Next, the ACS 11 transmits, to the main information processing section 24, a response signal (Inform Response) in response to the connection request signal (step S12). This response signal is a signal that the ACS 11 having received the connection request signal for the session from SGW 10 transmits to the SGW 10 in order to show that the session between the SGW 10 and the ACS 11 has been established.

Next, the ACS 11 grasps the bundles and the like installed in the SGW 10 based on the state information of the SGW 10 included in the connection request signal, and transmits, to the main information processing section 24, instruction information indicating installation of the bundle A and the bundle B which have not been installed in the SGW 10, for example (step S13). It should be noted that the ACS 11 may transmit the instruction information being included in the response signal, to the main information processing section 24.

Next, the main information processing section 24 downloads the bundle A and the bundle B distributed from the ACS 11, an external server, or the like based on the instruction information received from the ACS 11 (step S14).

Next, the main information processing section 24 generates a plurality of commands based on the instruction information indicating installation of the bundle A and the bundle B received from the ACS 11. Here, the main information processing section 24 generates a command indicating installation of the bundle A and a command indicating installation of the bundle B (step S15). It should be noted that the main information processing section 24 can generate a plurality of commands regarding the same bundle, such as a command indicating installation of the bundle A and a command indicating start of the bundle A, for example.

Next, the main information processing section 24 outputs, for example, the command indicating installation of the bundle A among the generated plurality of commands, to the sub information processing bundle 28 (step S16). At this time, the main information processing section 24 outputs a monitoring request for monitoring whether the bundle has been normally installed, the monitoring request being included in the command, to the sub information processing bundle 28.

Next, upon receiving the command indicating installation of the bundle A, the sub information processing bundle 28 requests the OSGi FW 22 to install the bundle A. Accordingly, installation of the bundle A is executed (step S17).

Upon obtaining an installation complete notification of the bundle A from the OSGi FW 22 (step S18), the sub information processing bundle 28 outputs an installation result indicating whether the bundle A has been normally installed, to the main information processing section 24 based on the monitoring request received from the main information processing section 24 (step S19).

Next, the main information processing section 24 determines whether the installation result of the bundle A received from the sub information processing bundle 28 indicates that the bundle A has been normally installed (step S20).

When the installation result of the bundle A does not indicate that the bundle A has been normally installed ("No" in step S20), the main information processing section 24 notifies the ACS 11 of the installation result indicating that installation of the bundle A has failed, without outputting another command, i.e., the command indicating installation of the bundle B, to the sub information processing bundle 28 (step S21).

Upon receiving the installation result indicating that installation of the bundle A has failed from the main information processing section 24, the ACS 11 ends the installation processing of the bundle A. It should be noted that when new instruction information indicating restart of the OSGi FW 22 and reinstallation of the bundle A is transmitted from the ACS 11 to the SGW 10, the main information processing section 24 and the sub information processing bundle 28 of the SGW 10 execute restart of the OSGi FW 22 in accordance with the instruction information, and then repeat the operation for installation of the bundle A.

On the other hand, when the installation result of the bundle A indicates that the bundle A has been normally installed ("Yes" in step S20), the main information processing section 24 notifies the ACS 11 of the installation result indicating that installation of the bundle A has been successful (step S22). In addition, the main information processing section 24 outputs a command indicating installation of the bundle B to the sub information processing bundle 28 (step S23). Also at this time, the main information processing section 24 outputs a monitoring request being included in the command, to the sub information processing bundle 28, as in the above.

Next, upon receiving the command indicating installation of the bundle B, the sub information processing bundle 28 requests the OSGi FW 22 to install the bundle B. Accordingly, installation of the bundle B is executed (step S24).

Upon obtaining an installation complete notification of the bundle B from the OSGi FW 22 (step S25), the sub information processing bundle 28 outputs an installation result indicating whether the bundle B has been normally installed, to the main information processing section 24 based on the monitoring request received from the main information processing section 24 (step S26).

Next, the main information processing section 24 determines whether the installation result of the bundle B received from the sub information processing bundle 28 indicates that the bundle B has been normally installed (step S27).

When the installation result of the bundle B does not indicate that the bundle B has been normally installed ("No" in step S27), the main information processing section 24 notifies the ACS 11 of the installation result indicating that installation of the bundle B has failed, as in the above (step S28).

Upon receiving the installation result indicating that installation of the bundle B has failed from the main information processing section 24, the ACS 11 ends the installation processing of the bundle B. It should be noted that when the SGW 10 receives, from the ACS 11, new instruction information indicating restart of the OSGi FW 22 and reinstallation of the bundle B, for example, the main information processing section 24 and the sub information processing bundle 28 of the SGW 10 execute restart of the OSGi FW 22 in accordance with the instruction information, and then repeat the operation for installation of the bundle B.

On the other hand, when the installation result of the bundle B indicates that the bundle B has been normally installed ("Yes" in step S27), the main information processing section 24 notifies the ACS 11 of the installation result indicating that installation of the bundle B has been successful (step S29). Then, the processing for installing the bundle A and the bundle B is completed.

In the example described above, a case has been described in which when installation of the bundle A has not been normally performed, installation of the bundle B is not executed. However, for example, regardless of whether installation of the bundle A has been normally performed, installation of the bundle B may be performed.

In the example described above, a case has been described in which instruction information transmitted from the ACS 11 to the SGW 10 is instruction information indicating installation of a bundle. However, the instruction information may be instruction information indicating update of a bundle, or instruction information indicating uninstallation of a bundle, for example.

(b) The Flow of Monitoring Operation of Monitoring whether Bundles are Normally Operating Next, the flow of monitoring operation of whether bundles installed by the SGW 10 are normally operating will be described for each of "the case where a monitoring result is notified to the ACS at occurrence of abnormality", "the case where a monitoring result is periodically notified to the ACS", and "the case where the ACS requests a monitoring result".

Figure 5:
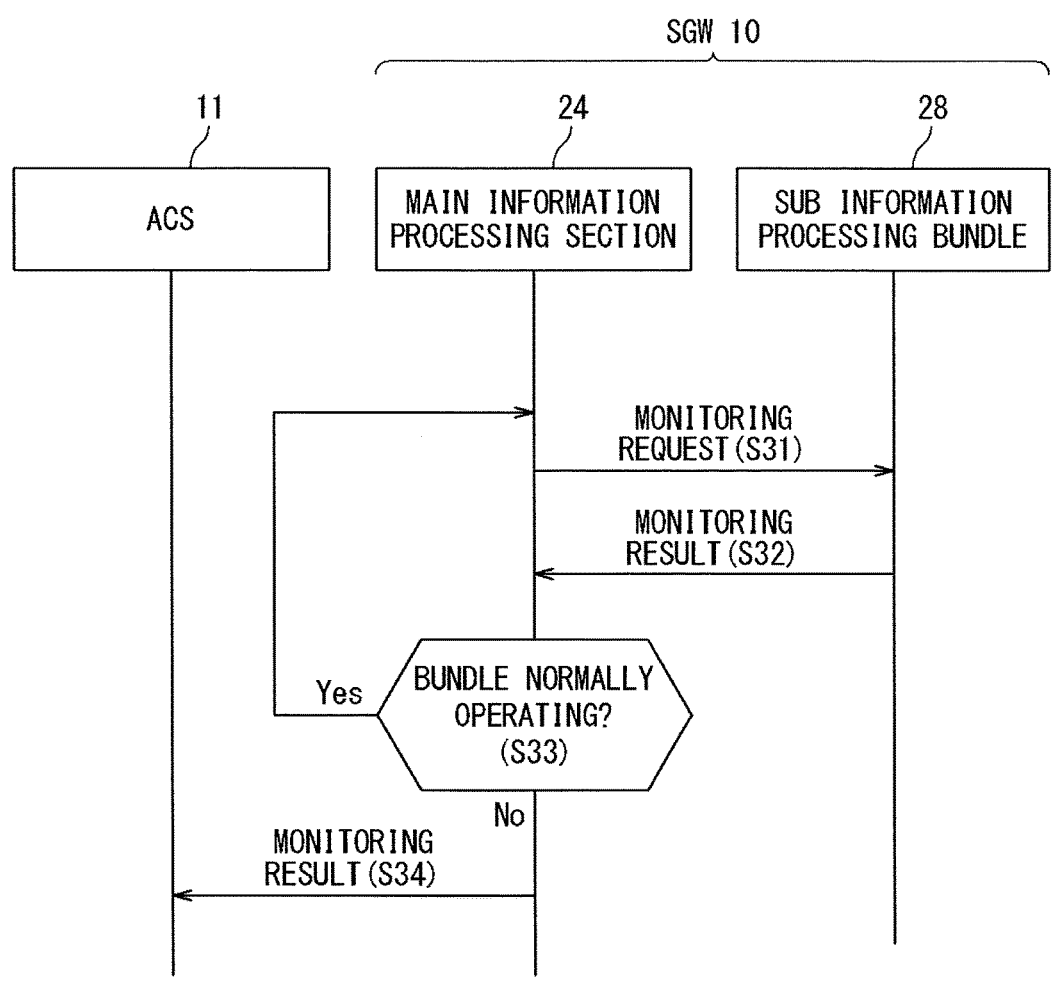
FIG. 5 is a sequence diagram showing one example of monitoring operation of monitoring whether the bundles in the SGW are normally operating, in the communication system according to the embodiment of the present invention.

(i) The Case where a Monitoring Result is Notified to the ACS at Occurrence of Abnormality FIG. 5 is a sequence diagram showing one example of monitoring operation of monitoring whether the bundles in the SGW are normally operating, in the communication system according to the embodiment of the present invention.

With reference to FIG. 5, first, the main information processing section 24 of the SGW 10 periodically outputs, to the sub information processing bundle 28, a monitoring request for monitoring whether the sub information processing bundle 28, the power monitoring bundle 29, and the home security bundle 30 included in the bundle group 23 are normally operating (step S31).

Next, upon receiving the monitoring request from the main information processing section 24, the sub information processing bundle 28 monitors whether the power monitoring bundle 29 and the home security bundle 30 are normally operating. Then, the sub information processing bundle 28 outputs a monitoring result to the main information processing section 24 (step S32). At this time, the sub information processing bundle 28 can also output a monitoring result indicating whether the sub information processing bundle 28 itself is normally operating, to the main information processing section 24.

Next, based on the monitoring result received from the sub information processing bundle 28, the main information processing section 24 confirms whether the sub information processing bundle 28, the power monitoring bundle 29, and the home security bundle 30 are normally operating (step S33). For example, the main information processing section 24 confirms whether the monitoring result received from the sub information processing bundle 28 indicates that the sub information processing bundle 28, the power monitoring bundle 29, or the home security bundle 30 is not normally operating.

When the main information processing section 24 has confirmed that the monitoring result indicates that the sub information processing bundle 28, the power monitoring bundle 29, or the home security bundle 30 is not normally operating ("No" in step S33), the main information processing section 24 transmits, to the ACS 11, a monitoring result indicating that bundles are not normally operating (step S34).

When the sub information processing bundle 28 is not normally operating, there are cases where the main information processing section 24 cannot receive a monitoring result from the sub information processing bundle 28. Therefore, also when the main information processing section 24 cannot obtain a monitoring result within a predetermined time period after transmission of the monitoring request, the main information processing section 24 transmits, to the ACS 11, a monitoring result indicating that bundles are not normally operating, as in the above. It should be noted that the main information processing section 24 may transmit, to the ACS 11, this monitoring result being included in a connection request signal (Inform) for a session with the ACS 11.

In this case, the ACS 11 transmits, to the SGW 10, instruction information for bundle recovery, such as restarting the OSGi FW 22, for example, and the main information processing section 24 and the sub information processing bundle 28 of the SGW 10 operate in accordance with this instruction information, thereby realizing bundle recovery.

On the other hand, upon determining that the bundles are normally operating ("Yes" in step S33), the main information processing section 24 does not transmit a monitoring result to the ACS 11.

(ii) The Case where a Monitoring Result is Periodically Notified to the ACS

Figure 6:
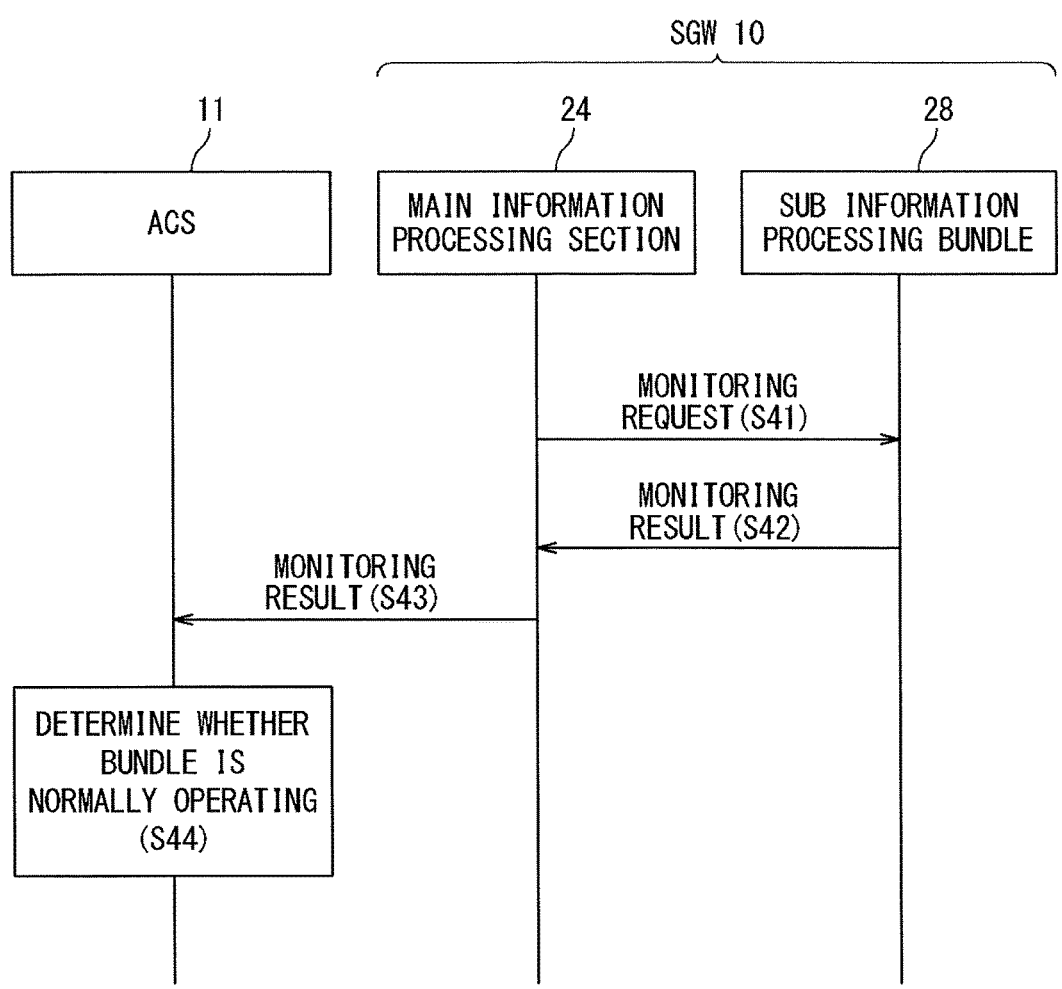
FIG. 6 is a sequence diagram showing one example of monitoring operation of monitoring whether the bundles in the SGW are normally operating, in the communication system according to the embodiment of the present invention.

FIG. 6 is a sequence diagram showing one example of monitoring operation of monitoring whether the bundles in the SGW are normally operating, in the communication system according to the embodiment of the present invention.

With reference to FIG. 6, step S41 and step S42 shown in FIG. 6 are the same as step S31 and step S32 shown in FIG. 5, and thus description thereof is not repeated here.

Next, regardless of whether the monitoring result received from the sub information processing bundle 28 indicates that the sub information processing bundle 28, the power monitoring bundle 29, or the home security bundle 30 is not normally operating, the main information processing section 24 transmits the monitoring result to the ACS 11 (step S43). Accordingly, the ACS 11 periodically obtains the monitoring result transmitted from the SGW 10.

Based on the monitoring result received from the main information processing section 24, the ACS 11 determines whether the sub information processing bundle 28, the power monitoring bundle 29, or the home security bundle 30 of the SGW 10 is normally operating. In a case where vendors are different among the plurality of SGWs 10 managed by the ACS 11, determination criteria for determining whether bundles are normally operating may differ among the SGWs 10. Thus, the ACS 11 may determine whether the sub information processing bundle 28, the power monitoring bundle 29, or the home security bundle 30 is normally operating, by use of determination criteria unique to the vendor of the SGW 10 concerned, for example (step S44).

(iii) The Case where the ACS Requests a Monitoring Result

Figure 7:
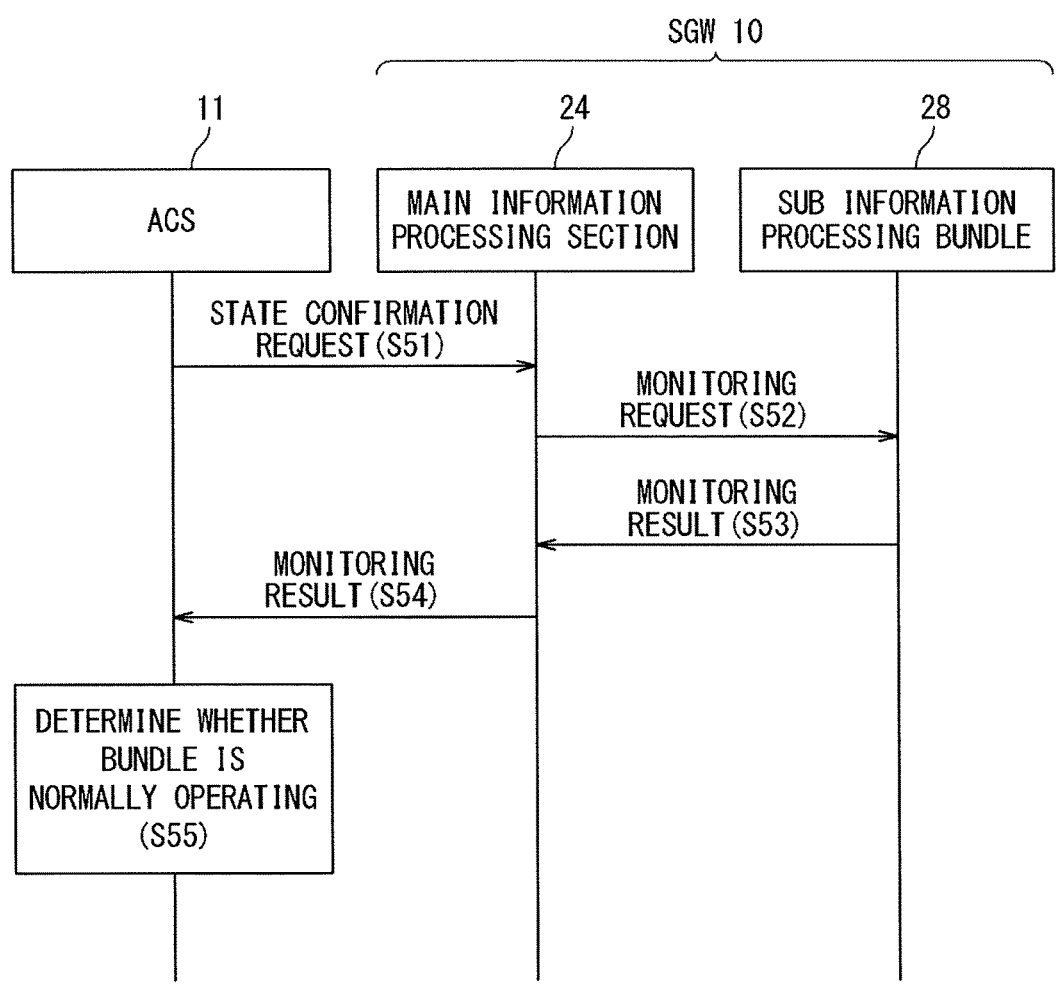
FIG. 7 is a sequence diagram showing one example of monitoring operation of monitoring whether the bundles in the SGW are normally operating, in the communication system according to the embodiment of the present invention.

FIG. 7 is a sequence diagram showing one example of monitoring operation of monitoring whether the bundles in the SGW are normally operating, in the communication system according to the embodiment of the present invention.

With reference to FIG. 7, first, the ACS 11 transmits a state confirmation request to the main information processing section 24 of the SGW 10 (step S51).

Next, upon receiving the state confirmation request from the ACS 11, the main information processing section 24 outputs, to the sub information processing bundle 28, a monitoring request for monitoring whether the sub information processing bundle 28, the power monitoring bundle 29, and the home security bundle 30 arc normally operating (step S52).

Next, upon receiving the monitoring request from the main information processing section 24, the sub information processing bundle 28 monitors whether the power monitoring bundle 29 and the home security bundle 30 are normally operating. Then, the sub information processing bundle 28 outputs a monitoring result to the main information processing section 24 (step S53). At this time, as in the above, the sub information processing bundle 28 can also output a monitoring result indicating whether the sub information processing bundle 28 itself is normally operating.

Next, regardless of whether the monitoring result received from the sub information processing bundle 28 indicates that the sub information processing bundle 28, the power monitoring bundle 29, or the home security bundle 30 is not normally operating, the main information processing section 24 transmits the monitoring result to the ACS 11 (step S54). It should be noted that, based on the monitoring result, the main information processing section 24 may confirm whether the sub information processing bundle 28, the power monitoring bundle 29, and the home security bundle 30 are normally operating, and may transmit a confirmation result to the ACS 11.

Based on the monitoring result received from the main information processing section 24, the ACS 11 determines whether the sub information processing bundle 28, the power monitoring bundle 29, and the home security bundle 30 are normally operating. At this time, as in the above, the ACS 11 may determine whether the bundle group 23 is normally operating by use of the determination criteria unique to the vendor of the SGW 10 concerned, for example (step S55).

When having received a determination result indicating whether the sub information processing bundle 28, the power monitoring bundle 29, and the home security bundle 30 are normally operating from the main information processing section 24, the ACS 11 grasps whether the sub information processing bundle 28, the power monitoring bundle 29, and the home security bundle 30 are normally operating, based on this determination result.

Each remotely-managed device downloads and installs a software module as necessary and deletes an unnecessary software module, thereby to change its functions flexibly. As a software plug-in framework for allowing operation of the same software module even in a case where the manufacturer or the type of hardware is different, and further, for allowing addition or replacement of a software module without restarting the appliance, there exists OSGi being a software module execution environment using Java (registered trademark). In the OSGi, a Java VM is executed as a process on an OS, and on that process, an OSGi FW being middleware described in Java language operates, and on top of this, one or a plurality of bundles are installed to be executed.

However, according to such OSGi, the remotely-managed device realizes the function to perform communication in accordance with TR-069, through operation of bundles. Thus, when abnormality has occurred in the bundles in such a case where one bundle among a plurality of bundles installed in the remotely-managed device has monopolized the resource and the other bundles cannot normally operate, the remotely-managed device cannot communicate with the managing device. Thus, there is a problem that the occurrence of the abnormality in the bundles is not notified to the managing device and recovery takes much time.

In contrast to this, the SGW 10 according to the embodiment of the present invention includes: the main information processing section 24 for communicating with the ACS 11, by use of the first layer; and the sub information processing bundle 28 for managing, on the second layer being an upper layer than the first layer, bundles operating by use of the second layer. The main information processing section 24 receives instruction information from the ACS 11 in accordance with CWMP, and outputs the received instruction information to the sub information processing bundle 28. The sub information processing bundle 28 manages bundles based on the instruction information received from the main information processing section 24.

In this manner, the main information processing section 24 which communicates with the ACS 11 operates by use of a lower layer than the layer where the bundles operate. Thus, even at occurrence of abnormality in the bundles, communication between the ACS 11 and the SGW 10 can be secured, and resistance against failure can be improved. That is, communication between the ACS 11 and the SGW 10 is secured even at occurrence of abnormality in the bundles, and thus, the occurrence of the abnormality in the bundles can be notified to the ACS 11. Therefore, early recovery of the bundles can be realized through remote management by the ACS 11.

In the SGW 10 according to the embodiment of the present invention, the main information processing section 24 notifies the ACS 11 of a monitoring result indicating whether the sub information processing bundle 28, the power monitoring bundle 29, and the home security bundle 30 are normally operating.

Through this configuration, in a case where not only the power monitoring bundle 29 and the home security bundle 30 but also the sub information processing bundle 28 which manages these bundles are not normally operating, early recovery can be realized through the remote management.

In the SGW 10 according to the embodiment of the present invention, the main information processing section 24 periodically outputs, to the sub information processing bundle 28, a monitoring request for monitoring whether the power monitoring bundle 29 and the home security bundle 30 are normally operating. Then, the sub information processing bundle 28 receives the monitoring request from the main information processing section 24, performs the monitoring, and outputs a monitoring result to the main information processing section 24. When the monitoring result indicates that the power monitoring bundle 29 or the home security bundle 30 is not normally operating, the main information processing section 24 notifies the ACS 11 of this monitoring result.

Thus, through the configuration where a monitoring result by the sub information processing bundle 28 is notified from the main information processing section 24 to the ACS 11 when bundles are not normally operating, the ACS 11 need not perform active monitoring, such as periodically making state inquiry to one or a plurality of SGWs 10 connected to the ACS 11 itself, and thus, load of the ACS 11 can be reduced. In addition, compared with the configuration where a monitoring result is periodically notified to the ACS 11, communication traffic between the ACS 11 and the SGW 10 can be reduced.

In the SGW 10 according to the embodiment of the present invention, the main information processing section 24 periodically outputs, to the sub information processing bundle 28, a monitoring request for monitoring whether the power monitoring bundle 29 and the home security bundle 30 are normally operating. Then, the sub information processing bundle 28 receives the monitoring request from the main information processing section 24, performs the monitoring, and outputs a monitoring result to the main information processing section 24. Then, regardless of whether the monitoring result indicates that the power monitoring bundle 29 or the home security bundle 30 is not normally operating, the main information processing section 24 notifies the ACS 11 of this monitoring result.

Through this configuration, a monitoring result indicating whether the bundles are normally operating is periodically transmitted to the ACS 11, and thus, the ACS 11 can easily grasp that the bundles are normally operating. In addition, the ACS 11 need not perform active monitoring, such as periodically making state inquiry to one or a plurality of SGWs 10 connected to the ACS 11 itself, and thus, load of the ACS 11 can be reduced.

In the SGW 10 according to the embodiment of the present invention, upon receiving a state confirmation request for confirming the state of the SGW 10 from the ACS 11, the main information processing section 24 outputs, to the sub information processing bundle 28, a monitoring request for monitoring whether the power monitoring bundle 29 or the home security bundle 30 is normally operating. Then, the sub information processing bundle 28 receives the monitoring request from the main information processing section 24, performs the monitoring, and outputs a monitoring result to the main information processing section 24. Then, the main information processing section 24 notifies the ACS 11 of the monitoring result indicating whether the power monitoring bundle 29 or the home security bundle 30 is normally operating.

Through this configuration, the ACS 11 can obtain a monitoring result of operation of bundles at a desired timing for the management entity. Accordingly, for example, when the ACS 11 has obtained a monitoring result indicating that bundles are not normally operating before transmitting instruction information indicating installation of a new bundle to the SGW 10, the ACS 11 can transmit instruction information for bundle recovery in preference to the instruction information indicating installation of the new bundle, or the like, and accordingly, the ACS 11 can take appropriate measures in accordance with the state of the SGW 10.

In the SGW 10 according to the embodiment of the present invention, the main information processing section 24 receives instruction information from the ACS 11, creates a plurality of commands based on the instruction information, and outputs the created plurality of commands to the sub information processing bundle 28, in order.

Through this configuration, the sub information processing bundle 28 performs operations in order, in accordance with the commands transmitted in order. Thus, when abnormality has occurred during operation of the sub information processing bundle 28, it becomes easy to determine which command among the plurality of commands is the cause for the operation where the abnormality occurred, and thus, it becomes possible to take appropriate measures against the abnormality that occurred.

In the SGW 10 according to the embodiment of the present invention, instruction information transmitted from the ACS 11 indicates installation, update, or uninstallation of a bundle.

Through this configuration, various types of management regarding bundles can be remotely performed from the ACS 11.

It should be understood that the embodiment above is merely illustrated and not restrictive in all aspects. The scope of the present invention is defined by the scope of the claims rather than the description above, and is intended to include meaning equivalent to the scope of the claims and all modifications within the scope.

REFERENCE SIGNS LIST

10 SGW (remotely-managed device)
11 ACS (managing device)
12 communication network
13 household electric appliances
20 OS
21 Java virtual machine
22 OSGi FW
23 bundle group
24 main information processing section
25 WAN interface section
26 wireless device
27 wireless device
28 sub information processing bundle (sub information processing section)
29 power monitoring bundle
30 home security bundle
50 SGW
60 OS
61 Java virtual machine
62 OSGi FW
63 bundle group
64 WAN interface section
65 wireless device
66 wireless device
67 communication control bundle
68 power monitoring bundle
69 home security bundle
100 communication system

The invention claimed is:

1. A remotely-managed device configured to operate on a plurality of hierarchical layers, the remotely-managed device comprising:
a communication interface configured to communicate with a managing device; and
a hardware processor programmed to instruct a main information processing section to communicate with the managing device via the communication interface, by use of a first layer; and
the hardware processor programmed to instruct a sub information processing section to manage, on a second layer being an upper layer relative to the first layer, an application operating by use of the second layer, wherein
the hardware processor of the main information processing section receives instruction information from the managing device via the communication interface in accordance with CWMP (CPE WAN Management Protocol), and outputs the received instruction information to the sub information processing section,
the hardware processor of the sub information processing section manages the application based on the instruction information received from the main information processing section,
the hardware processor of the main information processing section communicates with the managing device via the communication interface, by use of the first layer in which there is no application using a common resource, and
the hardware processor of the main information processing section periodically outputs a monitoring request for monitoring whether the application is normally operating, to the sub information processing section, and notifies the managing device via the communication interface of a monitoring result indicating whether the sub information processing section and the application are normally operating.

2. The remotely-managed device according to claim 1, wherein
the hardware processor of the sub information processing section receives the monitoring request from the main information processing section, performs the monitoring, and outputs a monitoring result to the main information processing section, and
when the monitoring result indicates that the application is not normally operating, the hardware processor of the main information processing section notifies the managing device of the monitoring result.

3. The remotely-managed device according to claim 2, wherein
the hardware processor of the main information processing section receives the instruction information from the managing device, creates a plurality of commands based on the instruction information, and outputs the created plurality of commands to the sub information processing section in order.

4. The remotely-managed device according to claim 2, wherein
the instruction information indicates installation, update, or uninstallation of the application.

5. The remotely-managed device according to claim 1, wherein
the hardware processor of the sub information processing section receives the monitoring request from the main information processing section, performs the monitoring, and outputs a monitoring result to the main information processing section, and the hardware processor of the main information processing section notifies the managing device of the monitoring result regardless of whether the monitoring result indicates that the application is not normally operating.

6. The remotely-managed device according to claim 5, wherein the hardware processor of the main information processing section receives the instruction information from the managing device, creates a plurality of commands based on the instruction information, and outputs the created plurality of commands to the sub information processing section in order.

7. The remotely-managed device according to claim 5, wherein the instruction information indicates installation, update, or uninstallation of the application.

8. The remotely-managed device according to claim 1, wherein the hardware processor of the main information processing section receives the instruction information from the managing device, creates a plurality of commands based on the instruction information, and outputs the created plurality of commands to the sub information processing section in order.

9. The remotely-managed device according to claim 1, wherein the instruction information indicates installation, update, or uninstallation of the application.

10. A non-transitory computer-readable storage medium having machine-readable instructions for accepting remote management to be used in a remotely-managed device stored thereon, wherein the remotely-managed device is configured to communicate with a managing device by use of a first layer and configured to manage, on a second layer being an upper layer to the first layer, an application operating by use of the second layer, and wherein the instructions are executable by a hardware processor to cause the machine to perform operations, comprising:

communicating with the managing device by a main information processing section via a communication interface, by use of a first layer; and managing, by a sub information processing section on the second layer, an application operating by use of the second layer;

receiving, by the main information processing section, instruction information from the managing device via the communication interface in accordance with CWMP (CPE WAN Management Protocol);

outputting, by the main information processing section, the received instruction information to the sub information processing section, wherein the sub information processing section manages the application based on the instruction information received from the main information processing section;

communicating, by the main information processing section, with the managing device via the communication interface, by use of the first layer in which there is no application using a common resource; and periodically outputting, by the main information processing section, a monitoring request for monitoring whether the application is normally operating, to the sub information processing section; and notifying the managing device via the communication interface of a monitoring result indicating whether the sub information processing section and the application are normally operating.

* * * * *